US00RE42161E

(19) United States
(12) Reissued Patent
Hochstein

(10) Patent Number: US RE42,161 E
(45) Date of Reissued Patent: Feb. 22, 2011

(54) POWER SUPPLY FOR LIGHT EMITTING DIODE ARRAY

(75) Inventor: Peter Anthony Hochstein, Troy, MI (US)

(73) Assignee: Relume Corporation, Oxford, MI (US)

(21) Appl. No.: 09/382,702

(22) Filed: Aug. 24, 1999

Related U.S. Patent Documents

Reissue of:
(64) Patent No.: 5,661,645
Issued: Aug. 26, 1997
Appl. No.: 08/673,200
Filed: Jun. 27, 1996

(51) Int. Cl.
*H02M 5/42* (2006.01)

(52) U.S. Cl. ..... 363/89
(58) Field of Classification Search ..... 323/282, 323/284; 363/89, 80, 53, 127, 81, 126
See application file for complete search history.

(56) References Cited

U.S. PATENT DOCUMENTS

| | | | | |
|---|---|---|---|---|
| 1,662,348 | A | 3/1928 | Stricker | |
| 2,503,574 | A | 4/1950 | Allen | 40/132 |
| 3,421,009 | A | 1/1969 | Caruthers | 250/217 |
| 3,456,155 | A | 7/1969 | Buchanan | 315/151 |
| 3,473,084 | A | 10/1969 | Dodge | 315/151 |
| 3,500,455 | A | 3/1970 | Ross et al. | 315/149 |
| 3,611,177 | A | 10/1971 | Helbers | 331/46 |
| 3,670,202 | A | 6/1972 | Paine et al. | 315/297 |

(Continued)

FOREIGN PATENT DOCUMENTS

| | | |
|---|---|---|
| CA | 2142132 | 9/1995 |
| CA | 2142332 | 9/1995 |
| CA | 786714 | 7/1997 |
| DE | 3535204 | 4/1986 |
| DE | 3535204 | 4/1988 |
| DE | 3644347 | 6/1988 |
| DE | 0472963 | 4/1992 |
| EP | 585595 | 7/1993 |
| EP | 0660648 | 12/1993 |
| EP | 0660648 | 6/1995 |
| JP | 0293921 | 7/1988 |
| JP | 6317822 | 7/1988 |
| JP | 63231687 | 9/1988 |
| JP | 0472963 | 4/1992 |
| JP | 9143938 | 6/1997 |
| JP | 9204843 | 8/1997 |

OTHER PUBLICATIONS

Defendant, Ecoulux, Inc.'s Answers to Plaintiff's Interrogatories No. 1–12, dated Feb. 1, 1999.

(Continued)

*Primary Examiner*—Adolf Berhane
(74) *Attorney, Agent, or Firm*—David M. Quinlan, P.C.

(57) ABSTRACT

An apparatus (10) for supplying regulated voltage d.c. electrical power to an LED array (12) includes a rectifier (32) responsive to a.c. power for generating rectified d.c. power and a power factor correcting and voltage regulating buck/boost switchmode converter (38) responsive to the rectified d.c. power for generating regulated voltage d.c. power to illuminate the LED array (12). A battery backup system (62) receives the a.c. power applied to the rectifier (32) for charging a rechargeable battery (66) and sensing an a.c. power failure. A switch-over relay (82) is connected between the battery backup system (62) and the rectifier. Upon sensing a failure of the a.c. power, the battery backup system (62) controls the switch-over relay (82) to connect the battery backup system (62) to the rectifier (32) to provide d.c. power to the switchmode converter (38) to illuminate the LED array (12). A half wave power detector (88) causes the apparatus (10) to reduce regulated d.c. power to dim the LED array (12).

16 Claims, 6 Drawing Sheets

U.S. PATENT DOCUMENTS

| | | | | | |
|---|---|---|---|---|---|
| 3,705,316 | A | | 12/1972 | Burrous et al. | 307/311 |
| 3,787,752 | A | | 1/1974 | Delay | 315/169 |
| 3,872,301 | A | | 3/1975 | Joppich | 250/205 |
| 3,873,905 | A | | 3/1975 | Marek | 323/9 |
| 3,952,242 | A | | 4/1976 | Ukai | 323/21 |
| 3,959,711 | A | | 5/1976 | Greenhalgh | 321/18 |
| 4,001,637 | A | | 1/1977 | Gray | 315/205 |
| 4,012,686 | A | | 3/1977 | Heine | 323/22 |
| 4,037,271 | A | | 7/1977 | Keller | 363/21 |
| 4,052,644 | A | | 10/1977 | Borejko | 315/151 |
| 4,090,189 | A | | 5/1978 | Fisler | 340/335 |
| 4,101,808 | A | | 7/1978 | Flint | 315/151 |
| 4,109,307 | A | | 8/1978 | Knoll | 363/101 |
| 4,135,116 | A | | 1/1979 | Smith | 315/158 |
| 4,182,977 | A | | 1/1980 | Stricklin, Jr. | 315/158 |
| 4,190,795 | A | | 2/1980 | Schultheis | 323/17 |
| 4,190,836 | A | | 2/1980 | Kimura et al. | 340/762 |
| 4,211,955 | A | | 7/1980 | Ray | 315/53 |
| 4,238,707 | A | | 12/1980 | Malissin et al. | 315/175 |
| 4,247,854 | A | | 1/1981 | Carpenter et al. | 340/788 |
| 4,275,335 | A | | 6/1981 | Ishida | 315/241 |
| 4,298,869 | A | | 11/1981 | Okuno | 340/782 |
| 4,319,164 | A | | 3/1982 | Tulleners | 315/219 |
| 4,323,895 | A | | 4/1982 | Coste | 340/782 |
| 4,329,625 | A | | 5/1982 | Nishizawa et al. | 315/158 |
| 4,342,947 | A | | 8/1982 | Bloyd | 315/199 |
| 4,347,461 | A | | 8/1982 | Carlson | 315/158 |
| 4,367,464 | A | | 1/1983 | Kurahashi et al. | 340/701 |
| 4,386,281 | A | | 5/1983 | Terry | 307/200 |
| 4,388,578 | A | | 6/1983 | Green et al. | 318/729 |
| 4,423,478 | A | | 12/1983 | Bullock et al. | 363/89 |
| 4,467,246 | A | | 8/1984 | Tanaka et al. | 315/158 |
| 4,492,899 | A | | 1/1985 | Martin | 315/308 |
| 4,495,445 | A | | 1/1985 | Turney | 315/169.1 |
| 4,568,857 | A | * | 2/1986 | Head | 315/105 |
| 4,571,506 | A | | 2/1986 | Lisco | 307/311 |
| 4,581,655 | A | | 4/1986 | Ide et al. | 358/242 |
| 4,587,459 | A | | 5/1986 | Blake | 315/158 |
| 4,598,198 | A | | 7/1986 | Fayfield | 250/205 |
| 4,645,997 | A | | 2/1987 | Whited | 323/211 |
| 4,656,365 | A | | 4/1987 | Billings | 307/140 |
| 4,673,865 | A | | 6/1987 | DeLuca et al. | 323/222 |
| 4,677,366 | A | | 6/1987 | Wilkinson et al. | 323/222 |
| 4,712,000 | A | | 12/1987 | Yoshikawa et al. | 250/205 |
| 4,717,868 | A | | 1/1988 | Peterson | 323/288 |
| 4,719,552 | A | | 1/1988 | Albach et al. | 363/44 |
| 4,729,076 | A | | 3/1988 | Masami et al. | 362/235 |
| 4,825,351 | A | | 4/1989 | Uesugi | 363/79 |
| 4,837,495 | A | | 6/1989 | Zansky | 323/222 |
| 4,845,489 | A | | 7/1989 | Hormel | 340/811 |
| 4,849,683 | A | | 7/1989 | Flolid | 323/284 |
| 4,855,890 | A | | 8/1989 | Kammiller | 363/44 |
| 4,868,669 | A | | 9/1989 | Miyazawa | 358/400 |
| 4,891,569 | A | | 1/1990 | Light | 323/210 |
| 4,902,936 | A | | 2/1990 | Yamada | 315/158 |
| 4,929,871 | A | | 5/1990 | Gerfast | 315/205 |
| 4,933,605 | A | | 6/1990 | Quazi et al. | 315/224 |
| 4,943,902 | A | | 7/1990 | Severinsky | 363/80 |
| 4,954,822 | A | | 9/1990 | Borenstein | 340/925 |
| 4,958,108 | A | | 9/1990 | Jorgensen | 315/307 |
| 4,969,282 | A | | 11/1990 | Eberhart | 40/545 |
| 4,970,437 | A | | 11/1990 | Stevens | 315/209 |
| 4,974,141 | A | | 11/1990 | Severinsky et al. | 363/81 |
| 4,980,812 | A | | 12/1990 | Johnson, Jr. et al. | 363/44 |
| 4,982,139 | A | | 1/1991 | Amir et al. | 315/151 |
| 4,988,889 | A | | 1/1991 | Oughton, Jr. | 307/66 |
| 5,001,620 | A | | 3/1991 | Smith | 363/89 |
| 5,003,454 | A | | 3/1991 | Bruning | 363/81 |
| 5,004,947 | A | | 4/1991 | Nilssen | 315/224 |
| 5,006,975 | A | | 4/1991 | Neufeld | 363/80 |
| 5,008,599 | A | | 4/1991 | Counts | 315/247 |
| 5,012,161 | A | | 4/1991 | Borowiec et al. | 315/247 |
| 5,012,162 | A | | 4/1991 | Chun | 315/309 |
| 5,019,952 | A | | 5/1991 | Smolenski et al. | 363/16 |
| 5,023,521 | A | | 6/1991 | Sridharan | 315/290 |
| 5,030,887 | A | | 7/1991 | Guisinger | 315/158 |
| 5,041,766 | A | | 8/1991 | Fiene et al. | 315/219 |
| 5,045,758 | A | | 9/1991 | Hildebrand | 315/151 |
| 5,047,912 | A | | 9/1991 | Pelly | 363/89 |
| 5,048,033 | A | | 9/1991 | Donahue et al. | 372/38 |
| 5,075,601 | A | | 12/1991 | Hildebrand | 315/291 |
| 5,089,748 | A | | 2/1992 | Ihms | 315/151 |
| 5,095,305 | A | | 3/1992 | Ide et al. | 340/780 |
| 5,113,337 | A | | 5/1992 | Steigerwald | 363/98 |
| 5,134,345 | A | | 7/1992 | El-Hamamsy et al. | 315/248 |
| 5,134,355 | A | | 7/1992 | Hastings | 323/211 |
| 5,135,160 | A | | 8/1992 | Tasaki | 235/462 |
| 5,146,398 | A | | 9/1992 | Vila-Masot et al. | 363/89 |
| 5,212,428 | A | | 5/1993 | Sasaki et al. | 315/308 |
| 5,235,504 | A | | 8/1993 | Sood | 363/53 |
| 5,258,692 | A | | 11/1993 | Jones | 315/247 |
| 5,272,327 | A | | 12/1993 | Mitchell et al. | 250/205 |
| 5,293,077 | A | | 3/1994 | Seki et al. | 307/10.8 |
| 5,309,062 | A | | 5/1994 | Perkins et al. | 315/53 |
| 5,313,187 | A | | 5/1994 | Choi et al. | 340/331 |
| 5,317,307 | A | | 5/1994 | Thomas, Jr. | 340/815.45 |
| 5,321,600 | A | | 6/1994 | Fierheller | 363/65 |
| 5,340,974 | A | | 8/1994 | Zalewski | 250/205 |
| 5,349,172 | A | | 9/1994 | Roustaei | 235/472 |
| 5,354,977 | A | | 10/1994 | Roustaei | 234/472 |
| 5,359,274 | A | | 10/1994 | Bandel | 323/207 |
| 5,359,276 | A | | 10/1994 | Mammano | 323/207 |
| 5,363,020 | A | | 11/1994 | Chen et al. | 315/209 |
| 5,367,223 | A | | 11/1994 | Eccher | 315/97 |
| 5,371,667 | A | | 12/1994 | Nakao et al. | 363/124 |
| 5,391,976 | A | | 2/1995 | Farrington et al. | 323/207 |
| 5,396,153 | A | | 3/1995 | Shackle | 315/247 |
| 5,408,084 | A | | 4/1995 | Brandorff et al. | 250/208 |
| 5,408,403 | A | | 4/1995 | Nerone et al. | 363/37 |
| 5,420,779 | A | | 5/1995 | Payne | 363/56 |
| 5,430,635 | A | | 7/1995 | Liu | 363/37 |
| 5,436,529 | A | | 7/1995 | Bobel | 315/127 |
| 5,436,553 | A | | 7/1995 | Pepper et al. | 323/259 |
| 5,438,586 | A | | 8/1995 | Ishii et al. | 372/50 |
| 5,446,440 | A | * | 8/1995 | Gleason et al. | 340/331 |
| 5,449,981 | A | | 9/1995 | Auld, Jr. et al. | 315/308 |
| 5,459,478 | A | | 10/1995 | Bolger et al. | 345/46 |
| 5,463,280 | A | | 10/1995 | Johnson | 315/187 |
| 5,489,771 | A | | 2/1996 | Beach et al. | 250/205 |
| 5,495,147 | A | | 2/1996 | Lanzisera | 315/185 |
| 5,510,680 | A | | 4/1996 | Nilssen | 315/209 |
| 5,532,918 | A | | 7/1996 | Mayrand et al. | 363/89 |
| 5,539,198 | A | | 7/1996 | McMichael et al. | 250/221 |
| 5,550,463 | A | | 8/1996 | Coveley | 323/300 |
| 5,563,781 | A | | 10/1996 | Clauter et al. | 363/124 |
| 5,572,112 | A | | 11/1996 | Saeki et al. | 323/282 |
| 5,572,416 | A | | 11/1996 | Jacobs et al. | 363/89 |
| 5,587,895 | A | | 12/1996 | Harkins | 363/89 |
| 5,614,812 | A | | 3/1997 | Wagoner | 323/222 |
| 5,615,101 | A | | 3/1997 | Moriarty | 363/101 |
| 5,633,629 | A | | 5/1997 | Hochstein | 340/907 |
| 5,635,902 | A | | 6/1997 | Hochstein | 340/433 |
| 5,638,265 | A | | 6/1997 | Gabor | 363/89 |
| 5,646,512 | A | | 7/1997 | Beckwith | 323/257 |
| 5,650,694 | A | | 7/1997 | Jayaraman et al. | 315/225 |
| 5,654,705 | A | | 8/1997 | Houten et al. | 340/944 |
| 5,661,374 | A | | 8/1997 | Cassidy et al. | 315/307 |
| 5,663,719 | A | | 9/1997 | Deese et al. | 349/912 |
| 5,684,368 | A | | 11/1997 | Wei et al. | 315/302 |
| 5,719,474 | A | | 2/1998 | Vitello | 315/307 |
| 5,734,229 | A | * | 3/1998 | Bavaro et al. | 315/86 |

| | | | | | |
|---|---|---|---|---|---|
| 5,764,039 | A | | 6/1998 | Choi et al. | 323/322 |
| 5,765,940 | A | | 6/1998 | Levy et al. | 362/240 |
| 5,767,979 | A | | 6/1998 | Kim | 358/296 |
| 5,782,555 | A | | 7/1998 | Hochstein | 362/373 |
| 5,783,909 | A | | 7/1998 | Hochstein | 315/159 |
| 5,785,418 | A | | 7/1998 | Hochstein | 362/373 |
| 5,845,987 | A | | 12/1998 | Painter | 362/206 |
| 5,852,348 | A | | 12/1998 | Lin | 315/185 |
| 5,857,767 | A | | 1/1999 | Hochstein | 362/294 |
| 5,929,568 | A | | 7/1999 | Eggers | 315/56 |
| 5,934,798 | A | | 8/1999 | Roller et al. | 362/497 |
| 5,936,599 | A | * | 8/1999 | Reymond | 345/82 |

OTHER PUBLICATIONS

Precision Solar Controls Inc.'s Answers and Objections to Relume's Interrogatories to Defendants Nos. 1–12, dated Feb. 1, 1999.

Responses and Objections of Defendant Dialight Corporation to Plaintiff Relume Corporation's First Set of Interrogatories, dated Feb. 5, 1999.

Supplemental Responses of Lumileds Lighting BV, Philips Lighting BV, and Hewlett–Packard Company to Relume's Interrogatories Nos. 1–7, 9 and 11, dated Apr. 30, 1999.

Objections and Responses of Lumileds Lighting BV, Philips Lighting BV, and Hewlett–Packard Company to Relume's Interrogatories Nos. 1–13, dated Feb. 2, 1999.

Supplemental Responses of Defendant Precision Solar Controls Inc. to Relume's Firs and Second Sets of Interrogatories dated Jun. 25, 1999 and 11, dated Apr. 30, 1999.

Supplemental Responses and Objections of Defendant Dialight Corporation to Plaintiff Relume Corporation 's First and Second Sets of Interrogatories dated ?31, 1999.

Compaint, Case No. 98–72360, filed Jun. 9, 1998.

First Amended Complaint, Case No. 98–72360, filed Jul. 29, 1998.

Affirmative Defenses and Counterclaim Defendant, Excolux's Answer to Plaintiff's Complaint, Case No. 98–72360, Jul. 14, 1990.

Defendant Ecoulux's Answer to Plaintiff's First Amended Complaint, Affirmative Defenses and Counterclaim, Case No. 98–72360.

Defendant Dialight Corporation's Answer, Affirmative Defenses, and Counterclaims, dated Nov. 2, 1998.

Defendant Lumileds Lighting VB's Answer to Plaintiff's First Amended Complaint, Affirmative Defenses and Counterclaims, Case No. 98–723, dated Nov. 2, 1998.

Defendant Philips Lighting BV'S Answer to Plaintiff's First Amended Complaint, Affirmative Defenses and Counterclaim, dated Nov. 2, 1998.

Defendant Hewlett–Packard Company's Answer to Plaintiff's First Amended Complaint, Affirmative Defenses and Counterclaim 98–723, dated Nov. 2, 1998.

Answer, Affirmative Defenses, and Counterclaim of Defendant Precision Solar Controls Inc dated Nov. 2, 1998.

Amended Answer, Affirmative Defenses, and Counterclaim of Defendant Precision Solar Controls Inc, Case No. 98–72360 dated Jul. 6, 1999.

Notice of Hearing, Case No. 98–72360, dated Feb. 4, 1999.

Second Declaration of Dr. Robert W. Erickson, Ph.D., Case No. 98–72360 dated Feb. 4, 1999.

Memorandum of Law in Support of Lumileds Lighting BV, Philips Lighting BV, and the Hewlett–Packard Company's Motion for Summary Judgment of Invalidity for Obviousness, dated Apr. 6, 1999.

Relume's Opposition to the Motion for Summary Judgment of Invalidity for Obviousness of Lumileds Lighting BV, Philips Lighting BV, Philips Lighting BV and the Hewlett–Packard Company, dated Apr. 26, 1999.

Exhibits in Support of Relume's Opposition to the Motion for Summary Judgment of Invalidity for Obviousness of Lumileds Lighting BV, Philips Lighting VB and the Hewlett–Packard Company, Case No. 98–72360.

Reply Brief in Support of Lumileds Lighting BV, Philips Ligthing BV, and the Hewlett–Packard Company's Motion for Summary Judgment of Invalidity for Obviousness, dated May 10, 1999.

12" LED Red Arrow Indication, by McCain Traffic Supply pp. 3–4.

8" and 12" LED Red Ball Indication, by McCain Traffic Supply pp. 5–6.

Practical Switching Power Supply Design, By Marty Brown pp. E11407–E11426.

High Power Factor Switching Regulator With no Rush Current by Isao Takahashi and Ricardo Y. Igarashi, pp. E11427 and E11434.

A New Control Strategy to Achieve Sinusoidal Line Current in a Cascade Buck–Boost Converter, by Mohammed C. Ghanem et al., pp. E11435–E11445.

Conducted Interference Voltage of AC–DC Converters, by M. Albach pp. E11446–E11455.

Motorola Semiconductor Technical Data, Power Factor Controllers pp. #11456–E11469.

Modeling and Simulation of a Digitally Controlled Active Rectifier for Power Conditioning, by Ray Hudson pp. E11470–E11476.

High Power–Factor Preregulator, pp. E11477–E11481.

Design Trade–Offs in Continuous Current–Mode Controlled Boost Power–Factor Correction Circuits, by Chen Zhou et al., pp. E11482–E11492.

Single–Chip Controller Provides Power Factor Correction for 350W Supply, by Fernando Martin et al., pp. E11493–E11501.

The UC3823A, B & US3825A, B Enhanced Generation of PWM Controllers By Unitrode Integrated Circuits, pp. E11502–E11511.

Power Factor Correction With the UC3854, by Unitrode Integrated Circuites pp. E11512–E11522.

High Frequency Power Conversion 1993 Conference by Harris Semiconductor, pp. E11523–E11533.

A New Very High Voltage Smartmos IC Combines Power Factor Control With Internation Off–Line Startup, pp. E11534–E11542.

Design of Power Factor Corrector for the Off–Line Isolated Buck/Boost Converter by a Voltage–Follower Technique Power Factor Correction With the UC3854, by Unitrode Integrate Circuites pp. E11543–E11548.

4.3 Transformer–Isolated Switching Power Supply Topologies, pp. E11549–E11550.

Switched Mode Power Supplies, By H.W. Whittington et al., pp. E11551–E11564.

File History for U.S. Patent: Vila–Masot et al., Patent No. 5,146,398 Issued: Sep. 8, 1992.

Solid State Optical Designs Set the Encoder Pace, from Control Engineering May 1975 issue. pp. 40–43.

LED Driver and Pin Diode Receiver ICS for Digital Fiber Optic Communications, SPIE vol. 150 Laser & Fiber Optics Communications (1978) pp. 169–174.

Methods of Temperature Stabilization of Light–Emitting Diode Radiation, Rev. Sci. Instrum. 65 (4), Apr. 1994, American Institute of Physics pp. 803–806.
Digitable Ubertragung Mit Lichtwellenleitern, Elekronik 14/1991, pp. 66–68.
Digital Displays, By R. Stephen, pp. 29 and 31.
LED Driver Output Level Control via Reflected Light Signal Sensing By IBM, Technical Disclosure Bulletin, vol. 23 No. 6, Nov. 1980., pp. 2187–2188.
Tri–Color LED Drive System, By IBM, Technical Disclosure Bulletin, vol. 29, No. 1 Jun. 1986, pp. 320–321.
6$^{th}$ European Conference on Power Electronics and Applications, by EPE Association, vol. 2, Sep. 20, 1995. pp. 003211–003216.
Digital Feedback Light–Emitting Diode Control, By IBM, Technical Disclosure Bulletin, vol. 16, No. 8, Jan. 1974, pp. E12064–E12067.
Design of Power Corrector for the Off–Line Isolated Buck/Boost Converter by a Voltage–Follower Techique, p. 959–964.
Conducted Inteference Voltage of AC–DC Converters, pp. 203–210.
Enhanced High Power Factor Prereulator, by Unitrode Integrated Circuits Dated May 1993, pp. 5–226 thru 5–228.
Improved Current Mode PWM Control, by Unitrode Integrated Circuits, dated Dec. 1992, pp. 5–229 thru 5–236.
High Power Factor Preretulator, by Unitrode Integrated Circuits, dated Feb. 1993 pp. 5–218 thru5–225.
Product & Application Handbook 1993–94 by Unitrode Integrated Circuits pp. 5–213 thru 5–217.
High Performance Power Factor Preregulator, By Unitrode Integrated Circuits, dated Nov. 1994, pp. 6–301 thru 6–306.
Improved Current mode PWM Controller, dated Nov. 1994, pp. 6–307 thru 6–314.
Enhanced High Power Factor Preregulator, dated Jan. 1995, pp. 6–295 thru 6–300.
High Power Factor Preregulator dated Oct. 1994 by Unitrode Integrated Circuits, pp. 6–287 thru 6–294.
Product & Applications Handbook, 1995–96, by Unitrode Integrated Circuits.
PWM Controller Chip Fixes Power Factor; Includes Related Articles on the ML4812 Power Factor Controller and on Reasons to Correct the Power Factor, by Information Access Company, dated Jun 8, 1989, pp. 1194011954.
Flyback Power Factor Controller, by Micro Linear, dated May 1997, pp. 8–43 thru 8–53.
Power Supply Cookbook, by Motorola, pp. 195–200.
Power Factor Controllers, by Motorola, pp. 3–439–3–551.
Digital Feedback Light–Emitting Diode Control, by IBM Technical Disclosure Bulletin, vol. 16, No. 8 Jan. 1974, pp. 2598–2601.
Power Factor Controller, By Electronics World, Wireless World, date: Dec. 1993 pp. 1034–1035.
Improved Current Mode PWM Controller, dated Nov. 1994, pp. 6–307–6–314.
High Performance Power Factor Preregulator, dated Nov. 1994 pp. 6–301–6,–306.
Enhanced High Power Factor Preregulator, by Unitrode Integrated Circuits, pp. 6–295–6300.
High Power Factor Preregulator, by Unitrode Integrated Circuits, dated Oct. 1994, pp. 6–287–6–294.
Improved Current Mode PWM Controller, by Unitrode Integrated Circuits, Dated Dec. 1992, pp. 5–229–5–236.
Enhanced High Power Factor Preregulator, by Unitrode Integrated Circuits, Dated May 1993, pp. 5–226–5–229.
High Power Factor Preregulator, by Unitrode Integrated Circuits, Dated Feb. 1993 pp. 5–218–5–225.
PWM Controller Chip Fixes Power Factor, By Information Access Company, Date Jun. 8, 1989, pp. 2–4.
Product & Applications Handbook 1995–1996, by Unitrode Integrated Circuits Dated Oct. 1994, pp. 6–278 thru 6–286.
Product & Applications Handbook 1993–1994, by Unitrode Integrated Circuits, Dated Dec. 1992, pp. 5–213–5–217.
Analog/Interace ICS, Device Data, vol. 1, Rev. 6, by Motorola, pp. 3–612–3–635.
Power Factor Correction With the UC3854, by Unitrode Integrated Circuits, pp. 1–10.
Design of Power Factor Corrector for the Off–Line Isolated Buck/Boost Converter by a Voltage–Follower Technique, pp. 959–964.
Conducted Interference voltage of AC–DC Converters, By M. Albach pp. 203–212.
Journal of Tsinghua University (Sci & Tech), dated 1997, pp. 89–92.
Lovell, B., et al., Lecture 12: 9E103 Electrical Physics and Electronics, University of Queensland, Nov. 5, 2000, http://www.itee.uq.edu.au/–engg1030/lectures/1perpage/lect12.pdf#search=%22lecture%2012%20transistor%22, last visited Oct. 12, 2006.
"Hi–Flux LED Modules—433 Series Traffic Signals," Dialight Specification Sheet, undated, http://www.dialight.com/pdf/TrafficSignals/MDTS433EXCAL001_A–W.pdf, last visited Oct. 12, 2006.
*Original Declaration of Robert B. Erickson,* pp. 1–9 dated Nov. 17, 1998.
*Third Declaration of Dr. Robert B. Erickson, Ph.D.* with Exhibit Tabs 1–15 dated Apr. 5, 1999.
*Supplemental Third Declaration of Dr. Robert B. Erickson, Ph.D.* with Exhibit Tabs 25–34, dated May 9, 1999.
*Table Comparison of the Third and Supplemental Third Declarations of Erickson with the Lumiled's Memoranda,* pp. 1–20.
*Special Masters Report,* pp. 1–34 dated Jan. 10, 2002.
Brief for Defendants–Cross–Appellants Lumileds Lighting BV, Phillips Lighting BV, and Hewlett Packard Company, dated May 1, 2000.
United States District Court Eastern District of Michigan Southern Division, Case No. 98–CV–72360, Opinion and Order dated Aug. 26, 1999.
Appeals From the United States District Court for the Eastern District of Michigan in Case No. 98–CV–72360, Judge John Feikens dated Jan. 27, 2000.

* cited by examiner

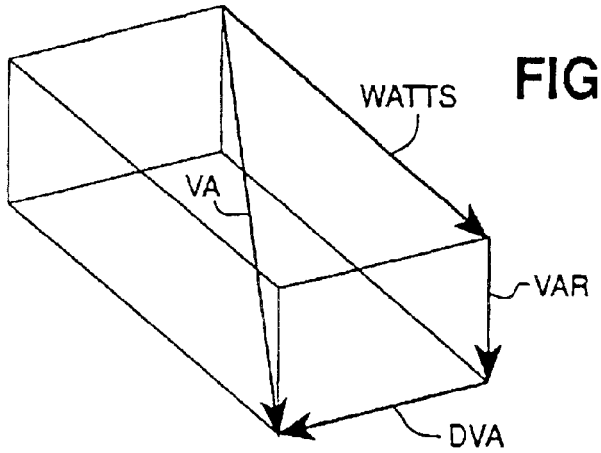
FIG - 4
FIG - 6a
Amended
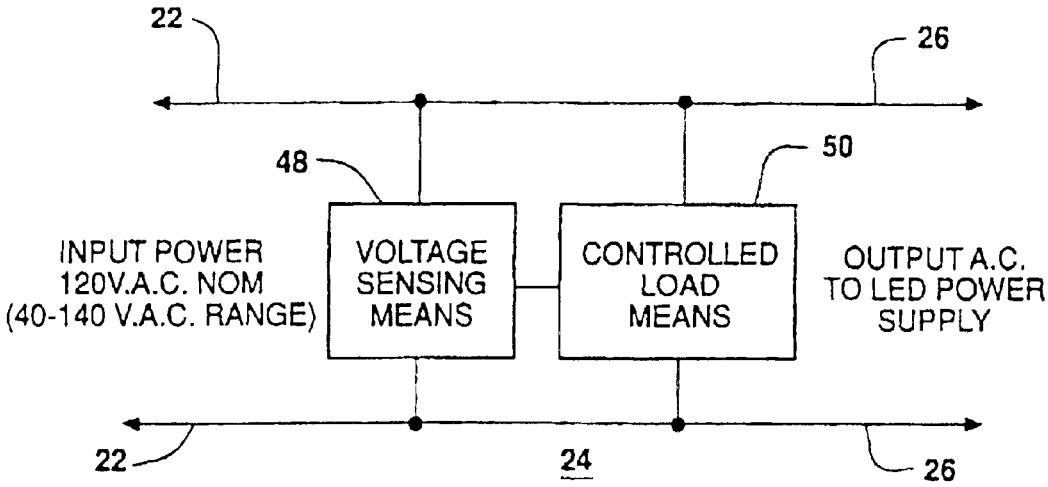
FIG - 6b
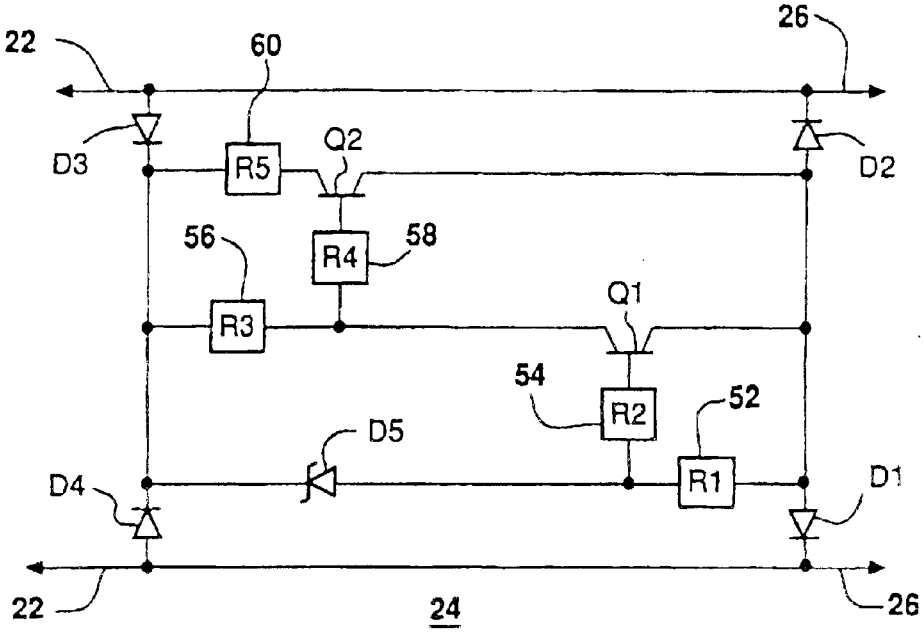

POWER SUPPLY FOR LIGHT EMITTING DIODE ARRAY

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is the parent of a continuation reissue application filed Mar. 5, 2008, and accorded application Ser. No. 12/074,723.*

BACKGROUND OF THE INVENTION

The present invention relates generally to an apparatus for generating power to a light emitting diode array and, in particular, to a power supply for operating light emitting diode array traffic signals.

Light emitting diode (LED) arrays are becoming more common in many applications as they are used to replace less efficient incandescent lamps. Status annunciators, message boards, liquid crystal display back lights and traffic signals are common applications for LED arrays. In most of these uses, electrical power is obtained from a.c. mains (120 v.a.c., 60 Hz) and some form of power supply converts the alternating line voltage to d.c., or pulsing d.c., for powering the plurality of LEDs.

LEDs typically exhibit forward voltage drops on the order of 1.2 to 2.0 volts when driven at average currents of 20 to 25 ma. For purposes of efficiency, the LEDs are usually connected in series so that a higher power supply voltage can be used to light an array of LEDs.

In many applications where a relatively large number of LEDs are necessary to deliver substantial light output, several series strings of LEDs with a ballasting resistor in each string are normally connected in parallel. As shown in the FIG. 1., this traditional circuit arrangement provides some redundancy from single point LED failure, as any "open" LED will only extinguish its own series string leaving the other strings active. Since this relatively simple circuit does not provide any regulation, i.e. the light output varies with varying input voltage, it has been generally superseded by the regulated circuit shown in the FIG. 2. The regulated circuit employs a linear current regulator instead of individual ballasting resistors to maintain a given current through the LED strings. The highly dissipative nature of such linear regulators makes such use questionable in heat sensitive apparatus such as LED signals however. Heat generated by the regulator could exacerbate the deterioration of the thermally sensitive LEDs.

A non dissipative. unregulated power supply for LED signals is shown in FIG. 3, and uses a series capacitor as the current limiting element. Such highly reactive power supplies exhibit very poor power factors however, and may be disallowed by power utilities.

Several problems are associated with these prior art simple circuit topologies. The input current wave forms are generally badly distorted and the power factor is poor. Reasons for the poor power factor and high distortion relate to the discontinuous conduction of the diodes in the circuit feeding large capacitors. This phenomenon is well understood, and plagues many small off line power supplies. Until recently these concerns were essentially disregarded by the electrical power industry because the impact to the power grid was relatively small. Of course, as larger numbers of these low power appliances are connected to the power grid, the effect is no longer inconsequential. In fact, many utilities are placing limits on permissible power factor and distortion behavior of electrical devices connected to their lines.

LED traffic signals are being retrofitted in place of incandescent lamps primarily because of the energy savings common to LED signals. For example, an 8 inch diameter incandescent signal might consume 67 watts and its LED equivalent 14 watts, or a 12 inch diameter incandescent signal would consume 150 watts while its LED replacement would consume only 28 watts. The dramatic energy savings translate into greatly reduced operating cost, which is an important criterion, as electrical power is becoming more expensive. Also, in many parts of the country, electrical generating capacity is at its limits, and new capacity cannot be added because of environmental concerns. This strong interest in LED signals as an important energy conservation resource is clouded however by the poor power factor performance of commercially available signals.

Power factor (p.f.) is well understood in the electrical engineering community as the ratio of real power to real power plus reactive power, or more conveniently. p.f.=cos $\theta$ where $\theta$ is the angle in electrical degrees of the current-voltage phase offset. That is, in many reactive loads powered by sinusoidal (alternating) current, the voltage and current may be out of phase.

The apparent power that has to be delivered to a given load in volt-amperes (VA) is, therefore equal to the true power consumption of the device in Watts divided by the power factor. For example, an appliance with an internal power consumption of 100 Watts that exhibited a power factor of 0.4, would require 100/0.4 or 250 VA of energy from the power line and utility generator. Taken separately, the many small electrical appliances that are widely used have only a moderate effect on generating capacity. However in aggregate, a large number of small devices can have a significant impact on the power grid.

By means of example, a medium size city (San Francisco) may have some 2000 signalized intersections with a total of 16,000 mixed 8 inch and 12 inch traffic signals. If the existing incandescent signals with an average power consumption of 100 watts are replaced with LED variants of 20 watt rating, a significant power saving should result. The 1600 kilowatt (kW) load imposed by the incandescent signals should be reduced to 320 kw by the LED retrofit devices. However, if the LED signals exhibit an actual power factor of 0.3, the resulting load to the power grid is 320 kW divided by 0.3 p.f. or 1067 kW. The energy savings is then only 533 kW, which is the net mount of power that the utility can convert to other uses. Clearly then, the need for power factors close to unity is apparent. Another factor that directly influences the amount of power (apparent VA) that needs to be delivered to a given load is the total harmonic distortion of the current waveform supplying the device. True power factor is adversely affected by current or voltage distortion, and the significance of this influence is only now being widely accepted. There is shown in the FIG. 4, a traditional power factor vector diagram (which is normally two dimensional) which has been expanded to a three dimensional form to indicate the influence of distortion on the apparent power vector. The total power required vector VA (apparent power) is determined by the combination of the working power vector WATTS, the volt-amperes reactive vector VAR (non-working power) and the distortion volt-amperes vector DVA (non-working power).

Harmonic distortion or deviation from true sinusoidal wave forms not only gives rise to further wasted energy, but increases the electromagnetic interference potential of the load. Radiated and conducted interference is a concern because of the interference potential with other services (radio communications for example).

Harmonic distortion is becoming more prevalent in power supplies as these devices are converted from inefficient linear operation to far more efficient switchmode operation. A wide variety of circuit topologies are used in modern switching power supplies such as thyristor and triac phase control, or bipolar or field effect transistor switches. A consequence of these solid state approaches is increased harmonic distortion and poor power factor behavior. In order to mitigate these problems, several approaches to power factor and distortion control have been developed that operate with and use the efficiency of the switchmode power supply itself. That is, instead of correcting for power factor in a separate functional device (that is connected between the power supply and line), the power factor and distortion correcting function is part of the switchmode power supply. A number of manufacturers of integrated circuits (Linear Technology, Silicon General, Motorola and Unitrode for example) offer monolithic devices that perform the power factor and distortion control function. A review of this art is presented in Power Supply Cookbook by Marty Brown, 1994, Butterworth-Heinemann.

SUMMARY OF THE INVENTION

The present invention concerns an apparatus for supplying regulated voltage d.c. electrical power to an LED array. The apparatus includes a rectifier having an input and an output, the rectifier being responsive to a.c power at the input for generating rectified d.c. power at the output, a power factor correction converter having an input connected to the rectifier output and an output, the power factor correction converter being responsive to the rectified d.c. power at the power factor correction converter input for generating regulated voltage, d.c. power at the power factor correction converter output, and an LED array having an input connected to the power factor correction converter output for receiving the d.c. power to illuminate the LED array. The power factor correction converter can be a power factor correcting and voltage regulating buck/boost switchmode converter.

A primary object of the present invention is to provide a power factor correcting, (boost buck/boost or buck) switchmode converter to power a line operated LED signal.

Another object of the present invention is to use the inherent pulse modulating nature of a switchmode power supply to provide voltage regulation to an LED array.

The apparatus according to the present invention also includes an adaptive clamp circuit connected to the rectifier input for eliminating leakage current problems. The adaptive clamp circuit has an input adapted to be connected to a pair of a.c. power lines, a pair of clamp circuit output lines connected to the adaptive clamp circuit input, a voltage sensing means connected across the adaptive clamp circuit input, and a controlled load means connected across the clamp circuit output lines and to the voltage sensing means. The voltage sensing means is responsive to a magnitude of a.c. voltage at the adaptive clamp circuit input lower than a predetermined magnitude for turning on the controlled load means to connect a low impedance load in the controlled load means across the clamp circuit output lines and the voltage sensing means is responsive to a magnitude of the a.c. voltage at the adaptive clamp circuit input equal to or greater than the predetermined magnitude for turning off the controlled load means to disconnect the low impedance load from the clamp circuit output lines.

It is also an objective of the present invention to eliminate leakage current problems by providing an adaptive clamp circuit.

Another feature of the present invention is to provide an adaptive line loading means or clamp that switches itself in or out of the circuit as needed.

The apparatus according to the present invention further includes a battery backup system having an input for receiving a.c. power applied to the rectifier input and having an output at which d.c. power is generated, and a switch-over relay connected to the battery backup system output and to the rectifier input, the battery backup system being responsive to a failure of a.c. power at the battery backup system input for controlling the switch-over relay to connect the battery backup system output to the rectifier input to provide d.c. power to illuminate the LED array and being responsive to a.c. power at the battery backup system input for controlling the switch-over relay to disconnect the battery backup system output from the rectifier input.

Another object of the present invention is the use of a d.c. power supply (instead of the a.c. power line) as a power backup that is activated upon a.c. power line loss.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a three dimensional vector diagram of the total power required to operate an LED array;

FIG. 6a is a schematic block diagram of the adaptive clamp circuit shown in the FIG. 5;

FIG. 6b is a schematic diagram of the adaptive clamp circuit shown in the FIG. 6a.

DESCRIPTION OF THE PREFERRED EMBODIMENT

Figure 1:
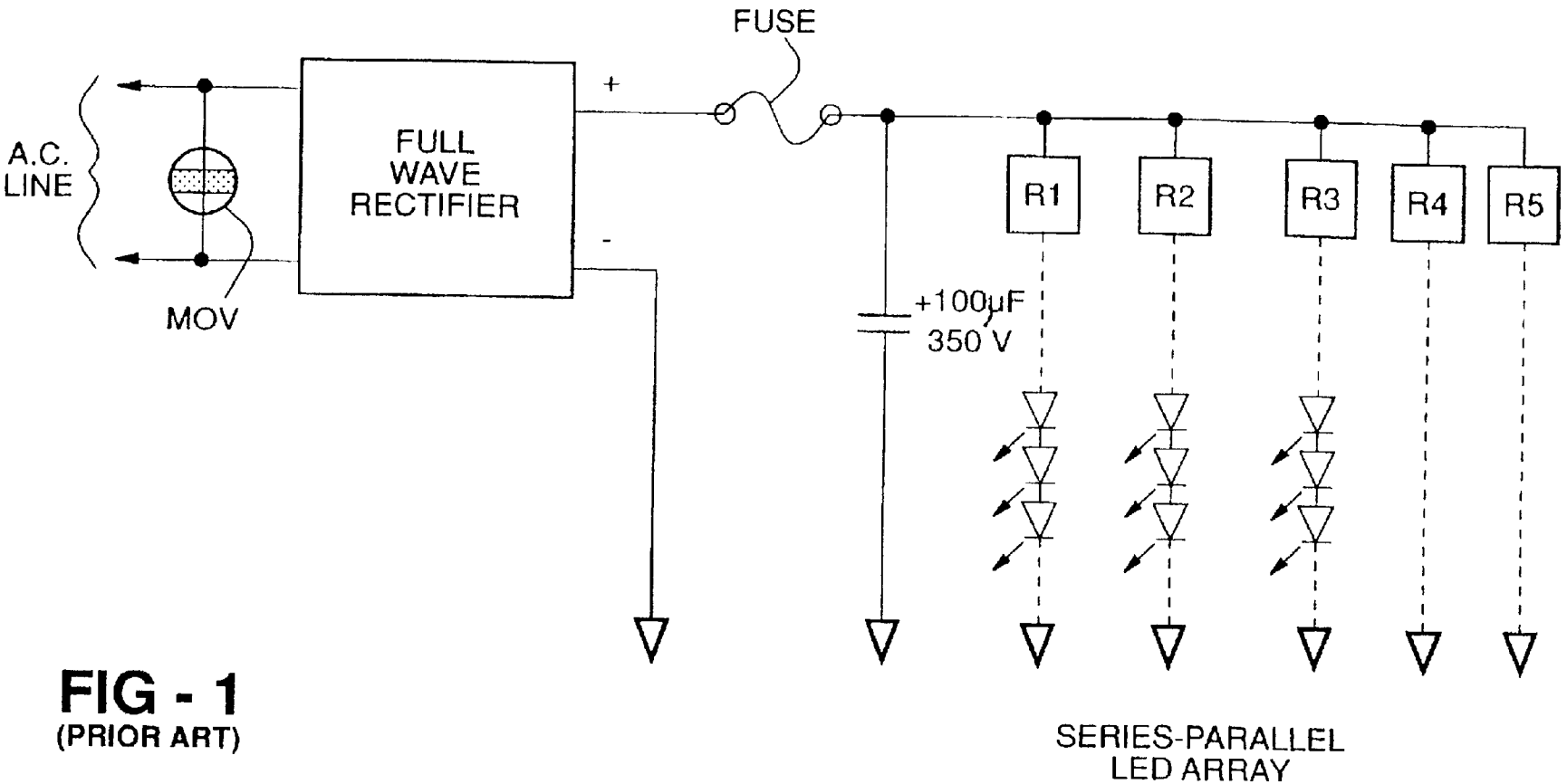
FIG - 1 (PRIOR ART)
FIG. 1 is a schematic diagram of a prior art unregulated power supply for LED signals.
Figure 2:
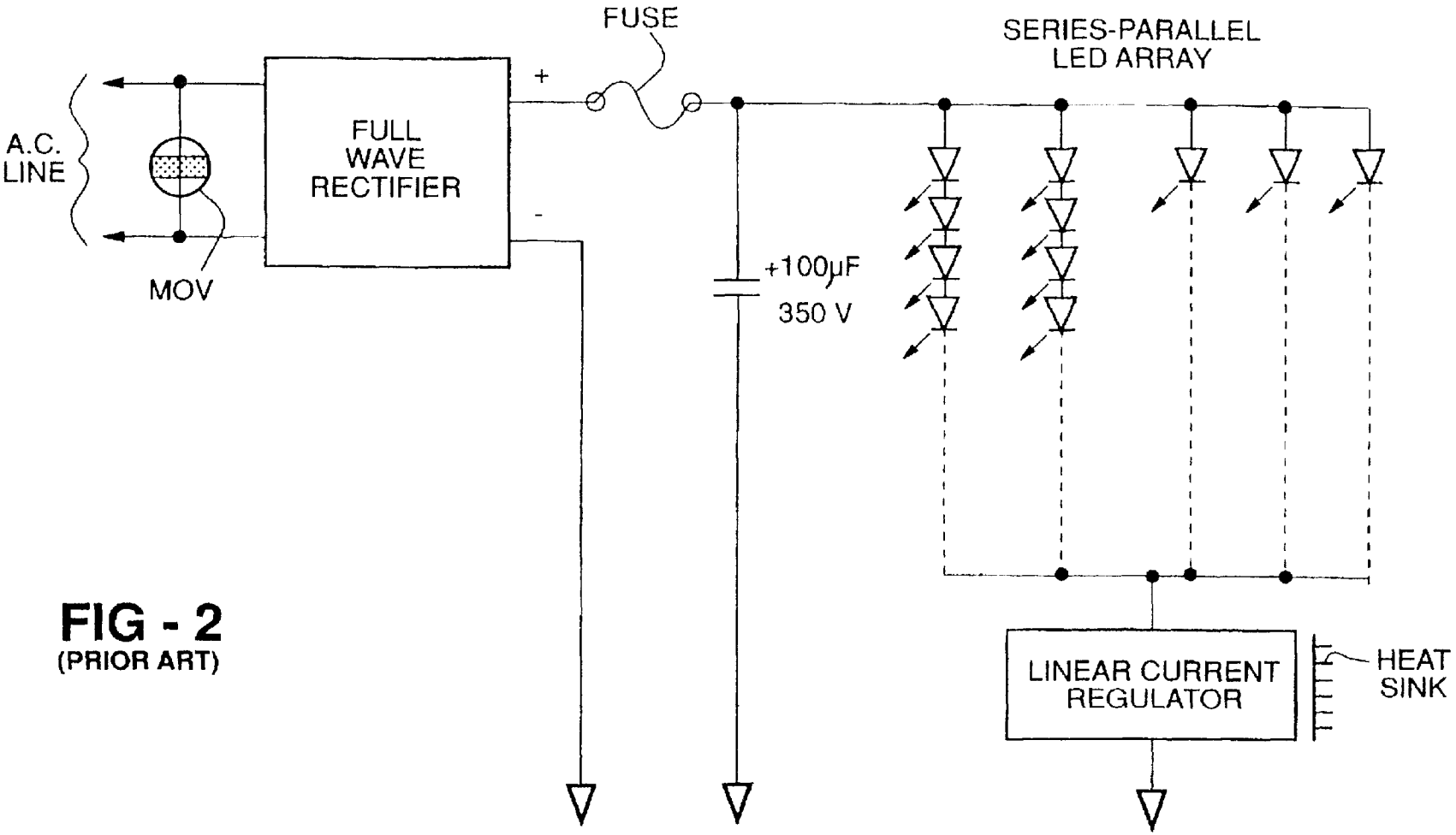
FIG - 2 (PRIOR ART)
FIG. 2 is a schematic diagram of a prior art linear current regulated power supply for LED signals.

As noted above, the elementary power supplies that are currently used for powering LED array signals do not meet current standards for efficiency, reliability and performance. The unregulated, resistively ballasted power supply shown in the FIG. 1 does not isolate the LEDs from line voltage variations, and exhibits a poor power factor because of the rectifier and large capacitor. The commercially produced current regulated LED power supply, which is shown in the FIG. 2, does provide much better LED light intensity regulation with input voltage variation. However, the use of a linear, dissipative (heat producing) regulator presents problems. LEDs are thermally sensitive devices which degrade quickly at elevated temperatures. Since most power supplies for LED signals are part of, or are attached to the LED array, heat rise from the linear regulator can be deleterious. Furthermore, the traditional rectifier-capacitor circuit does not produce a satisfactory power factor.

Figure 3:
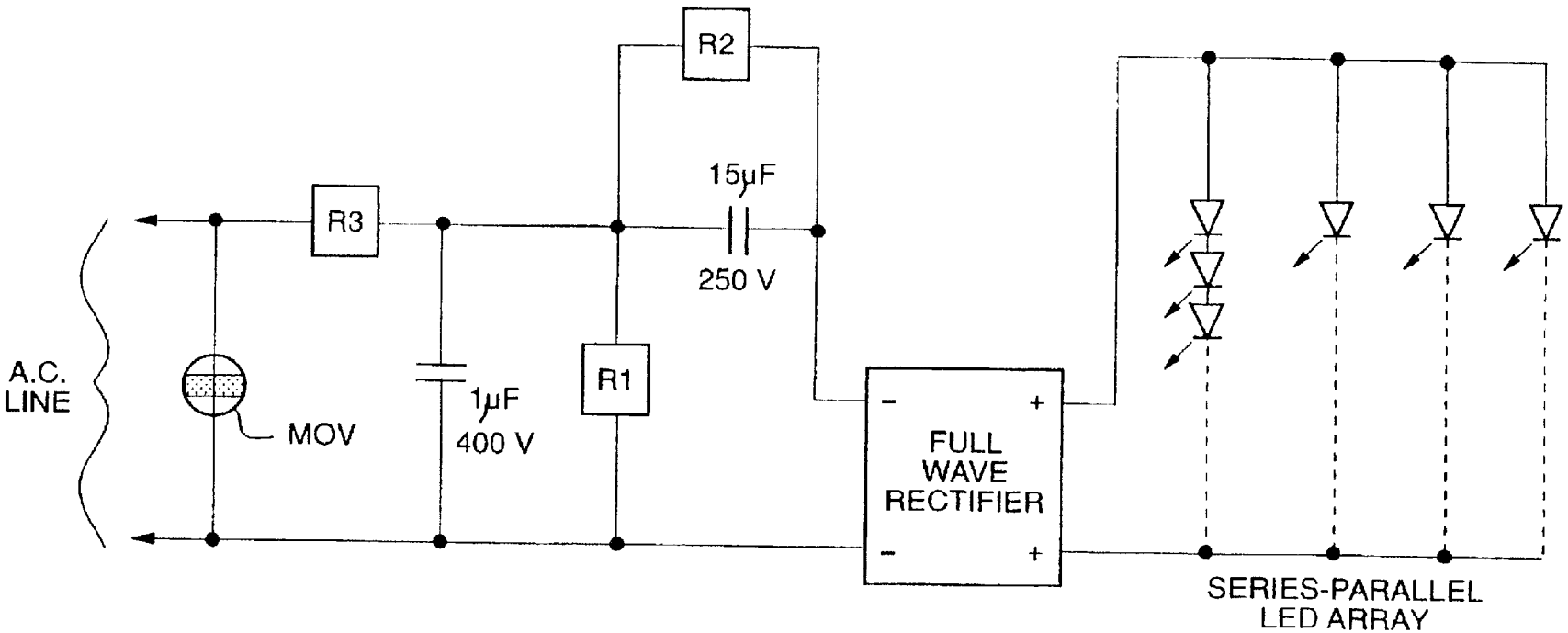
FIG - 3 (PRIOR ART)
FIG. 3 is a schematic diagram of a prior art reactively ballasted power supply for LED signals.

The use of capacitors as non-dissipative current limiters in a.c. circuits is well established, and is shown in the FIG. 3 as another example of a commercially available LED array signal power supply. Current and voltage wave forms are essentially out of phase in this type of circuit so that heat is not generated in the current limiting capacitor (15 μF). However, the power factor and distortion performance of this type of circuit is very poor (P.F.≈0.3).

Figure 5:
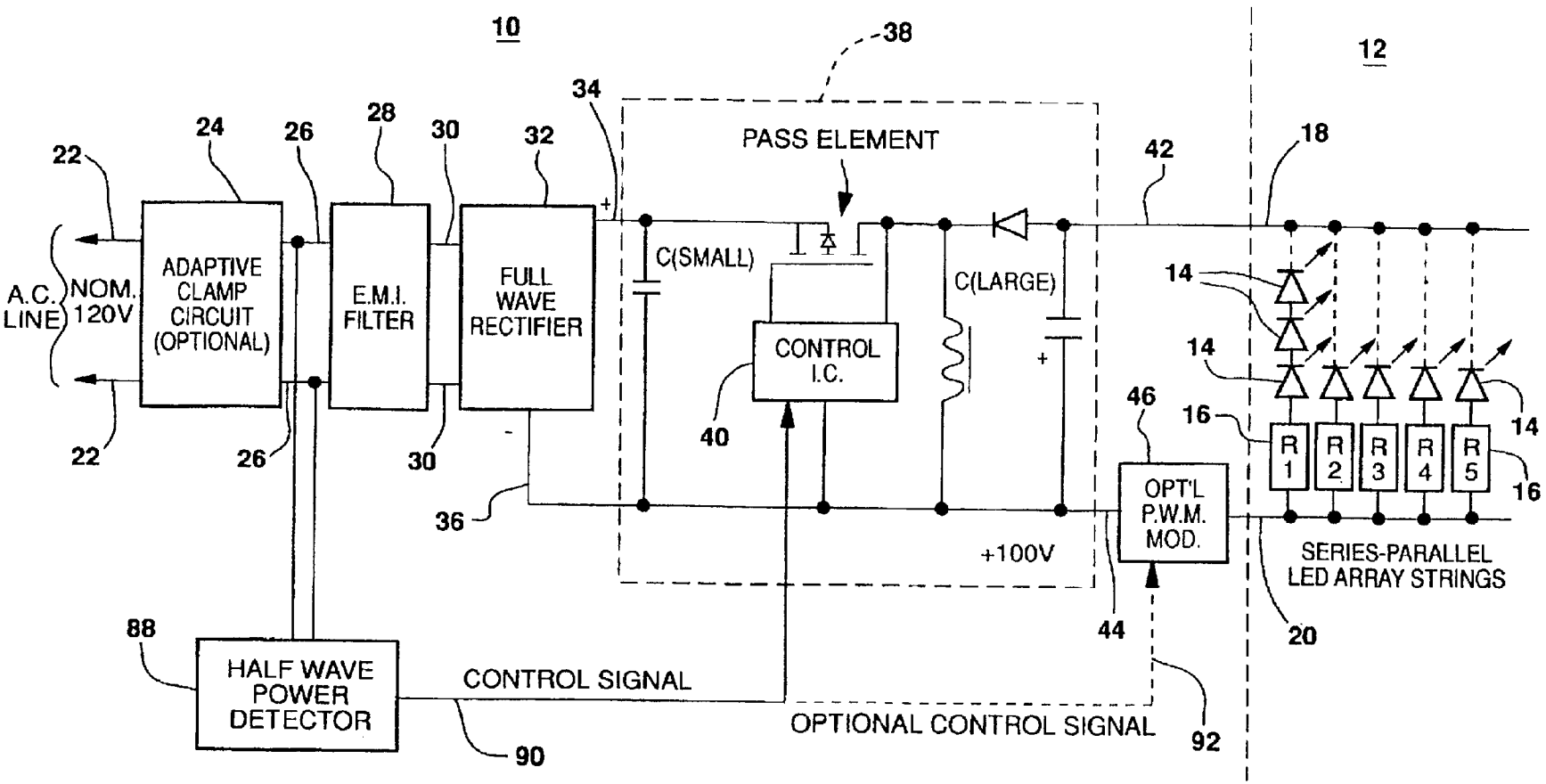
FIG. 5 is a schematic diagram of a regulated voltage, switchmode power supply for LED signals in accordance with the present invention.

There is shown in the FIG. 5, a regulated voltage, switchmode power supply 10 according to the present invention connected to an LED array 12. The LED array 12 includes a plurality of strings of series connected LEDs 14 with a ballasting resistor 16 (R1, R2, R3, R4, R5, . . . ) connected in each string. The strings are connected in parallel between a first input line 18 and a second input line 20 of the LED array 12.

The power supply 10 has a pair of power input lines 22 for connection to a source (not shown) of a.c. power such as main power lines at a nominal 120 volts a.c. An input of an adaptive clamp circuit 24 can be connected to the lines 22 as an option. A problem peculiar to signals that are switched by means of solid state relays is the leakage current that can flow through the load when the solid state switch or relay is "OFF". This phenomenon is common to triac and thyristor switches that are commonly employed in traffic signal controllers. While not apparent when incandescent signals are employed (because they are low impedance loads), the problems surface when relatively low power loads (such as LEDs) are connected to these same controllers. Typically, other safety devices used in traffic signal controllers such as conflict monitors must be "tricked" to reduce this leakage current. Commonly, a large capacitor is placed across the a.c. input leads to the LED load, in order to absorb the leakage current reactively. Of course, such provisions only aggravate the power factor problems.

An output of the adaptive clamp circuit 24 is connected by a pair of clamp circuit output lines 26 to an input of an electromagnetic interference (E.M.I.) filter 28. The E.M.I. filter 28 keeps conducted interference from feeding back into the power lines where it might cause problems to other circuitry on the line. An output of the filter 28 is connected by a pair of filter output lines 30 to an input of a rectifier means 32 which converts the incoming a.c. power to a pulsing d.c. power generated on a positive polarity rectifier output line 34 and a negative polarity rectifier output line 36. Although the rectifier means is shown as a full wave diode bridge rectifier, any type of rectifier can be used. The lines 34 and 36 are connected to an input of a power factor correction, buck/boost converter 38. The converter 38 includes a power factor correction (P.F.C.) integrated circuit (I.C.) controller 40, which is a commercial device available from many sources and functions by allowing current to charge a storage capacitor C (LARGE) only in phase with the rectified a.c. voltage thereby assuring a power factor close to unity. The control I.C. 40 also provides voltage regulation in the switchmode buck/boost converter by monitoring the output voltage and adjusting the high frequency on-off switching period of the pass element commensurately. Although a buck/boost converter is diagrammed, buck or boost topologies are also possible. Voltage output and current-mode control techniques are the primary differences in the various geometries, but these details are incidental to the functionality of the circuit.

A positive polarity output of the converter 38 is connected by a positive polarity converter output line 42 to the first input line 18 of the LED array 12. A negative polarity output of the converter 38 is connected by a negative polarity convener output line 44 to the second input line 20 of the LED array 12 through an optional pulse width modulated (P.W.M.) modulator 46.

The output voltage from the P.F.C. switch mode converter 38 is either fed directly to the LED array 12, or alternatively through the P.W.M. modulator 46. Such pulse modulation has been shown to be advantageous in certain LED signal applications. The functions of the switchmode P.F.C. converter 38 as the off line power supply are the same irrespective of the load. The obvious advantage of using a switching, voltage regulated power supply is efficiency. Line isolation, which is generally not provided by this transformerless design, is generally unnecessary for insulated LED signals, but a high frequency transformer could be incorporated. The intrinsic power factor correction provided by using the switchmode converter 38 in conjunction with the P.F.C. integrated circuit controller 40 is not only cost effective, but allows d.c. backup power to be used in case of line failure.

A primary aspect of the present invention is the use of a power factor correcting, (boost, buck/boost or buck) switchmode converter to power a line operated LED array signal 12. Another function of the present invention is to use the inherent pulse modulating nature of the switchmode power supply to provide voltage regulation to the LED array signal 12. Instead of using dissipative (heat producing) linear regulators for either voltage or current (to accommodate line voltage variations), the power factor and distortion controlling switchmode power supply 10 is used as an efficient voltage regulator. That is, the LED array 12, consisting of a large number of series-parallel connected LED devices 14, can be kept at essentially constant luminosity over a substantial range of input voltages. In actual practice, the output of such LED array signals has been kept within ±10% of nominal value over a power line variation of 85 volts to 140 volts (for a nominal 120 v.a.c. line).

It is also an objective of the present invention to eliminate leakage current problems by providing the adaptive clamp circuit 24 which is shown in more detail in the FIGS. 6a and 6b. The power input lines 22 are connected directly through the adaptive clamp circuit 24 to the clamp circuit output lines 26. The adaptive clamp circuit 24 monitors the input voltage feeding the LED array 12 on the input lines 22 with a voltage sensing means 48 connected across the lines 22 and loads the input lines resistively with a low impedance controlled load means 50, connected across the output lines 26, whenever the line voltage is below some critical amount (typically 40 volts a.c. r.m.s.). The adaptive clamp circuit 24 assumes that voltages lower than a certain value (typically 40 volts) are due to leakage currents through the solid state control relay or switch. The adaptive clamp circuit 24 loads the lines with a resistor to draw current, forcing the leakage voltage to a lower voltage (typically on the order of 10 volts a.c.) that will not cause problems for the conflict monitor or power factor correction (p.f.c.) circuit. Most traffic signals must be capable of being flashed (at least the red and yellow signals) from the traffic controller electronics. It has been found experimentally that residual leakage currents interfere with the ability to flash signals that are equipped with power factor correction circuits. The adaptive clamp circuit 24 prevents this problem by allowing the p.f.c. circuit to completely discharge between power line pulses which flash the signal at a nominal sixty flashes per minute. In summary, the adaptive clamp circuit 24 performs two functions by reducing the leakage voltage: 1) it provides a reactance free means to eliminate problems with conflict monitors (while preventing poor power factors); and 2) it allows the p.f.c. circuit to properly flash the LED array signal 12.

The adaptive clamp circuit 24 is shown in more detail in the FIG. 6b wherein a first pair of diodes D3 and D4 has anodes connected to the lines 22 and cathodes connected together. A second pair of diodes D1 and D2 has cathodes connected to the lines 26 and anodes connected together. A first resistor (R1) 52 is connected between the junction of the second pair of diodes D1 and D2 and an anode of a Zener diode D5. The Zener diode D5 has a cathode connected to the junction of the first pair of diodes D3 and D4. A second resistor (R2) 54 is connected between the anode of the Zener diode D5 and a base of a first NPN transistor Q1. The transistor Q1 has an emitter connected to the junction of the second pair of diodes D1 and D2 and a collector connected through a third resistor (R3) 56 to the junction of the first pair of diodes D3 and D4. A fourth resistor (R4) 58 is connected between the collector of the transistor Q1 and a base of a second NPN transistor Q2. The transistor Q2 has an emitter connected to the junction of the second pair of diodes D1 and D2 and a collector connected through a fifth resistor (R5) 60 to the junction of the first pair of diodes D3 and D4.

The optional adaptive clamping circuit 24 is advantageously placed across the input terminals of the p.f.c., switchmode power supply 10 as shown in the FIG. 5. As noted above, as a consequence of using solid state relays or switches in signal controllers, the power to the signals is not fully disconnected (even when the signal should be off). This leakage current often causes problems with safety devices such as electronic conflict monitors. Additionally, these leakage currents may present problems during flashing operation of LED signals, as the power supply circuits may not be fully discharged between flashes. Switchmode, p.f.c. power suppliers of the type proposed for the present invention are particularly sensitive to such leakage currents and will be inhibited from flashing LEDs at an acceptable rate (55 to 60 flashes per minute).

In current practice, these leakage currents are minimized by "short circuiting" them by means of a reactive, non dissipative element. The input capacitor (typically 1–2 μF), as shown in the FIG. 3 for example, performs this function. However this same capacitor is across the line when the LED array signal is energized, drawing reactive power and contributing to a poor power factor.

Another feature of the present invention is to provide for an adaptive line loading means or clamp that switches itself in or out of circuit as needed. As shown in the FIG. 6b, the adaptive clamp circuit 24 monitors the line voltage, and when only leakage currents are present that drop the line voltage to about 40 v.a.c. the circuit applies a resistive load 60 across the lines 22 by turning on the solid-state switch Q2. When the lines 22 are loaded by the fifth resistor 60, having a suitable value (typically 1 kOhm), the leakage voltage will drop to under 10 volts. At this depressed voltage, the p.f.c. switchmode converter is fully off, and can properly flash the LEDs 14 at the requisite rate.

This adaptive clamp 24 can of course be used with other types of power supplies where the addition of reactive elements could degrade the power factor. The clamping circuit 24 works by using the sensing transistor Q1 and the Zener diode D5 (the voltage sensing means 48 of the FIG. 6a) to determine if the line voltage is below a certain magnitude (typically 40 volts). The sensing transistor Q1 and the Zener diode D5 are the voltage sensing means 48 of the FIG. 6a. If the Zener diode D5 does not conduct, the transistor Q2 is turned on to place the load resistor 60 the power lines 22 causing the leakage voltage to drop below 10 volts. The transistor Q2 and the resistor 60 are the controlled load means 50 of the FIG. 6a. Whenever the traffic signal controller relay "closes", the line voltage appearing at the input to the adaptive clamping circuit 24 rises to nominally 120 volts and the sensing circuit (Q1 and D5) turn off the controlling transistor Q2, removing the resistor 60 from the circuit thereby preventing unnecessary dissipation of power. Since there are no reactances involved, this circuit does not influence the power factor reflected at the a.c. input lines 22.

Another aspect of the present invention is the use of a d.c. input (instead of the a.c. power line) as a power backup feature that is activated upon power line loss. Conventional practice employs battery driven a.c. inverters to generate the backup power upon line failure. Such inverters are expensive, inefficient and are failure prone. The use of battery power (d.c.) to directly energize the regulated switchmode power supply that powers the LED array signal is very cost effective and energy efficient. The wide input voltage range of most switchmode power supplies allows the batteries to be used optimally as they can be virtually fully discharged in the power backup cycle yielding very good use of battery capacity. Lower cost, smaller batteries are therefore useable.

As noted previously, the use of a direct line operated, non-transformer isolated converter to power the LED array signal allows d.c. power to be used (instead of a.c.) in case of line failure. Using batteries without having to rely on an inverter to perform the d.c. to a.c. conversion is novel, extremely reliable, and cost effective. The importance of battery backup for critical traffic signals is obvious, and the need for reliability is also apparent. As shown in the FIG. 7, a battery backup system 62 includes a temperature compensated, line powered automatic battery charger 64 having an input connected to the lines 22 and an output connected to an input of a rechargeable battery 66 to keep the battery fully charged at all times that a.c. power is available. Temperature compensation can be used to stop the charging process to extend the life of the battery, as it is well known that the optimal end point charging voltage for most secondary cells is a function of temperature.

Because of the critical safety nature of these devices, an automatic battery testing circuit and load 68 is built into the battery backup system 62. Deterioration of the battery 66, which is inevitable ova time, is thereby monitored and degradation past a certain point is nagged or announced. The testing circuit 68 has an input connected to an output of the battery 66 for sensing battery voltage. An alarm signal line 70 is connected to an output of the circuit 68 for generating the alarm signal and a set flag signal line 72 is connected to another output of the circuit 68 for generating the set flag signal. A control line 74 is connected between an output of the circuit 68 and an input of the battery 66. Secondary batteries that are kept in float service for any length of time tend to degrade and loose capacity. This deterioration is far more apparent in high temperature environments, and can adversely affect the safety margins of the backup power supply. That is. instead of providing 8 to 10 hours of flashing red LED array signal backup service, a degraded battery might only last a few hours. Determining the actual condition or serviceability of a storage battery is difficult, because a measurement of terminal voltage does not necessarily indicate loss of capacity. It has been experimentally determined that a good measure of battery capacity can be made by loading the battery with a substantial current (typically 5–10 amperes)

for several minutes and measuring the terminal voltage under load. Naturally the battery charger is inhibited during this test. This method is well recognized as a good diagnostic test as it depletes any "surface charge" on the electrodes and more accurately indicates remaining battery ampere-hours.

A voltage comparator circuit in the battery testing circuit and load 68 establishes an "accept" or "reject" level for the battery 66 as it is tested every 24 hours or so. In order to accommodate partly discharged cells, two sequential, battery tests that result in a "reject" are registered in a latch which may trigger a visual or audible alarm signal on the line 70. Alternatively, a relay or contact closure (flag) may be set to generate a signal on the line 72 so that a data modem can relay the degraded battery information to a central service facility. Of course, such calls or alarm signals are triggered well before the battery is no longer serviceable so that safety is not comprised.

A line failure detection circuit 76 has an input connected to the power lines 22 and another input connected to an output of the battery 66 to receive operating power from the battery. The circuit 76 initiates the power switch-over process whenever a.c. input power is disconnected. An output of the line failure detection circuit 76 is connected to an input of a time delay and restoration circuit 78 which has another input connected to an output of the battery 66 to receive operating power from the battery. The time delay function ensures that short, transient line dropouts are disregarded. An output of the time delay and restoration circuit 78 is connected to an input of a d.c. power switch-over and flasher circuit 80 which has another input connected to an output of the battery 66 to receive operating power from the battery. Outputs of the circuit 80 are connected to a first set of input terminals of a switch-over relay 82. The relay has a second set of terminals connected to red signal outputs of a traffic controller 84 having an input connected to the power lines 22. Output terminals of the switch-over relay 82 are connected to the input of the switchmode converter power supply 10 which is connected to the red LED array signal 12. Normally, the switch-over relay 82 is in the position shown to connect a.c. power on the lines 22 through the traffic controller 84 to the power supply 10.

Generally, line loss in excess of 250 msec will cause the d.c. power switch-over relay 82 to switch the output terminals to disconnect the power supply 10 and the red LED array signal 10 from the traffic controller 84 (and the a.c. feed) and connect them to the d.c. battery 66 through the d.c. power switch-over and flasher circuit 80. Note that the d.c. supply is flashed or pulsed by the circuit 80 at a nominal rate of 60 pulses per minute (1 Hz) to place all the red LED array signals at an intersection in a flashing mode, effecting a four way stop. While an electromechanical switch-over relay 82 is shown for complete isolation of the existing traffic controller 84 and the battery backup system 62, solid state devices could be used.

Whenever the line power is restored, the time delay and restoration circuit 78 will wait some period (typically 10–15 seconds) before the LED array signal 12 is switched back to the a.c. power mode. This delay avoids the many transients that usually accompany a.c. line restoration after a power outage. Note that no inverter is employed in this system, as is common practice in existing commercial hardware. The inefficiency and poor reliability of d.c. to a.c. converters is thereby avoided. Because the switchmode power supply 10 can accommodate wide variations in input voltage (both a.c. and d.c.) the storage battery 66 can be discharged virtually completely while maintaining essentially constant luminosity of the LED array signal 12.

Figure 7:
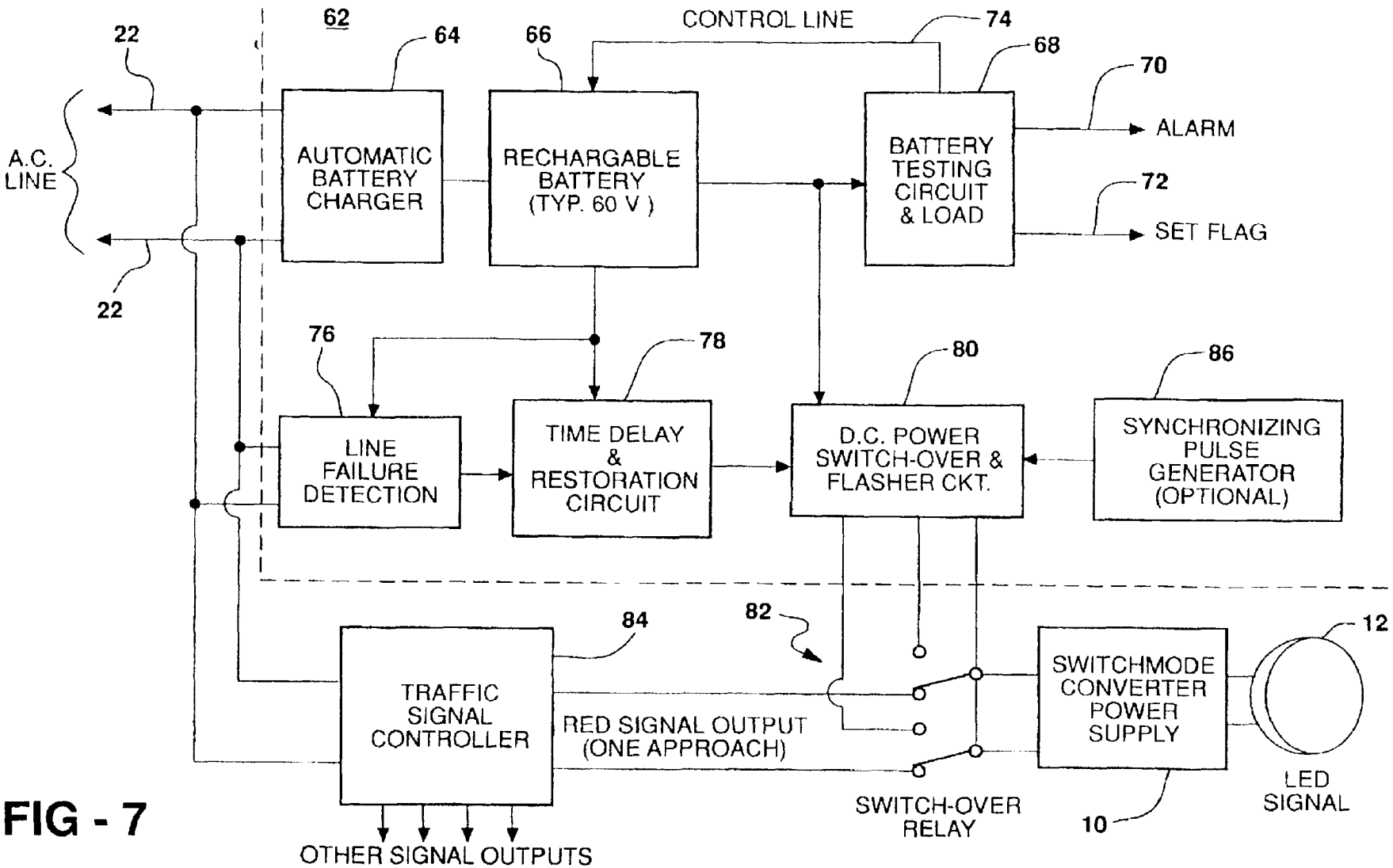
FIG. 7 is a schematic block diagram of a battery backup system for LED signals according to the present invention.

Additionally, as shown in the FIG. 7, there are provisions for the introduction of narrow "marker pulses" superimposed on the d.c. supply for use as synchronizing pulses. An optional synchronizing pulse generator 86 has an output connected to an input of the d.c. power switch-over and flasher circuit 80 for generating such pulses. This optional feature permits a number of LED array signals that are pulse modulated to operate in sync in the absence of the 60 Hz a.c. line signal. These "marker pulses" are essentially short (200 μsec) power dropouts that do not affect the operation of the LED array signal 12, but are easily extracted at the signal to effect pulse synchronization of several pulsed LED array signals.

As noted above, the lack of input transformers or series capacitors before the full wave bridge, allows d.c. power to be applied at the input terminals of the power supply 10 in lieu of a.c. power. Since there are no reactive (a.c.) components in the input circuitry, proper operation of the switchmode converter is maintained, and output voltage regulation is still available. Obviously, the p.f.c. portion of the circuit 10 will be nonfunctional during operation on d.c. input power. As shown, the switchmode convener will provide an essentially constant output voltage (nom. 100 volts d.c.) to the LED array 12 over a range of a.c. input voltages from 85 volts r.m.s. to 140 volts r.m.s. and over a d.c. input voltage range of 38 volts d.c. to 65 volts d.c. The wide (input voltage) operating range allows rechargeable batteries to be used very efficiently, since their capacity can be fully utilized in the discharge cycle, as their terminal voltage drops.

As discussed above, LED signals are being used to replace incandescent lamps in many applications. Traffic signals are among the more common devices that are being upgraded for with LEDs because of the tremendous power savings and the dramatic improvement in service life. In most cases the incandescent lamps are merely replaced with an integral LED retrofit assembly that does not require any modification of the existing traffic signal housing or the drive and control circuitry associated with the signal. That is, users expect the LED retrofit lamps to operate normally without added modifications to the housing or traffic controller.

One aspect of this conversion to LED signals from incandescent lamps poses significant problems however. Many existing incandescent lamp traffic signals are dimmed at night to reduce glare and, of course, power consumption. LED signals can be dimmed by reducing the average current through the LED array. A problem arises however because existing traffic signal controllers dim incandescent signals by providing half-wave rectified a.c. to the devices. Normally the traffic lamps are powered by switched a.c. line power which has, in virtually all cases, a sinusoidal wave form. Simply rectifying this power allows the traffic signal controller to reduce the average voltage and current to the load in a loss free manner. This technique has been in common use for many years and has become the "defacto" standard dimming technique.

Most LED traffic signals do not work satisfactorily with half wave rectified a.c.; in fact, many simply do not light. Some LED lamp arrays which are equipped with regulated power supplies will illuminate satisfactorily when powered by half wave rectified a.c. current, but they do not dim. The regulated power supplies accept the half wave rectified a.c. line power and treat it merely as a low line voltage and correct for this phenomenon. The voltage impressed across the LED array is kept relatively constant in spite of such input voltage variations thereby keeping the LED luminous output essentially unchanged, i.e. undimmed.

Certain switchmode, regulating power supplies are able to power LED signals satisfactorily from even half wave rectified a.c. power supplies. A half wave detector circuit in the LED signal power supply can determine whether the traffic signal controller is sending a "dimming" command. Upon detection of this half wave signal, the switchmode power supply can be programmed or adjusted to reduce its output voltage to the LED array. By adjusting either the pulse width or the frequency (at constant pulse width) of the switchmode power supply, the output voltage (and/or current) can be reduced in an efficient, nondissipative manner.

Alternatively, the half wave detector can be used to change the average current through the LED array by reducing the effective pulse width of a pulse width modulation controller that drives the LEDs. In either method, the average LED current and intensity are reduced in response to the detection of a half wave rectified input current. In this way, the LED signal is "transparent" to the user who may now utilize the LED device in the same manner as conventional incandescent signals.

As shown in the FIG. 5, a half wave power detector circuit 88 has inputs connected to the inputs of the full wave rectifier 32 at the clamp circuit output lines 26 to monitor the input a.c. power on the power input lines 22 to the power supply 10. The detector 88 has an output connected to a control signal line 90 which is connected to an input of the control I.C. 40. The detector 88 generates a control signal on the line 90 in response to the detection of a half wave dimming signal on the a.c. power lines 22. The control signal is directed to the power supply regulator circuit 38, where it causes the output voltage of the switchmode power supply 10 to be reduced in response to the dimming command. For current regulated power supplies, the average output current to the LED arrays can be reduced to effect dimming. In cases where the LED array is powered by a pulse width modulator, such as the modulator 46, the connection of the line 90 to the control I.C. 40 is eliminated and the output of the detector 88 is connected by a control signal line 92 to an input of the modulator 46 such that the average current delivered to the LED array may be reduced by decreasing the pulse width of the modulator.

All such dimming methods have one key feature in common; the average current through the LED signal 12 is decreased in response to the detection of a half wave dimming signal impressed on the power supply input lines 22. The detection of half wave power by the detector 88 causes the LED power supply 10 to either adjust the output pulse width at constant frequency or adjust the frequency at constant pulse width. The power supply 10 can be any type of power supply which converts a.c. power to d.c. power suitable for illuminating the LED array 12.

The present invention is an apparatus 10 for supplying regulated voltage d.c. electrical power to an LED array including a rectifier means 32 having an input and an output, the rectifier means 32 being responsive to a.c. power at the input for generating rectified d.c. power at the output, a power factor correction converter means 38 having an input connected to the rectifier means 32 output and an output, the power factor correction converter means 38 being responsive to the rectified d.c. power at the power factor correction converter means input for generating regulated voltage, power factor corrected d.c. power at the power factor correction converter means output, and an LED array 12 having an input connected to the power factor correction converter means 38 output for receiving the power factor corrected d.c. power to illuminate the LED array 12. The power factor correction converter means 38 can be a power factor correcting and voltage regulating buck/boost switchmode converter.

The apparatus 10 includes a pulse width modulated modulator means 46 connected to the power factor correction converter means 38 output and the LED array 12 input for modulating the power factor corrected d.c. power and an electromagnetic interference filter means 28 connected to the full wave rectifier means 32 input for preventing conducted interference from feeding back onto a.c. power lines 22 connected to the rectifier means 32 input. The apparatus 10 also includes an adaptive clamp circuit means 24 connected to the rectifier means 32 input for eliminating leakage current problems. The adaptive clamp circuit means 24 has an input adapted to be connected to a pair of a.c. power lines 22, a pair of clamp circuit output lines 26 connected to the adaptive clamp circuit means 24 input, a voltage sensing means 48 connected across the adaptive clamp circuit means 24 input, and a controlled load means 50 connected across the clamp circuit output lines 26 and to the voltage sensing means 48. The voltage sensing means 48 is responsive to a magnitude of a.c. voltage at the adaptive clamp circuit means 24 input lower than a predetermined magnitude for turning on the controlled load means 50 to connect a low impedance load 60 in the controlled load means 50 across the clamp circuit output lines 26 and the voltage sensing means 48 is responsive to a magnitude of the a.c. voltage at the adaptive clamp circuit means 24 input equal to or greater than the predetermined magnitude for turning off the controlled load means 50 to disconnect the low impedance load 60 from the clamp circuit output lines 26.

The apparatus 10 further includes a battery backup means 62 having an input for receiving a.c. power applied to the rectifier means 32 input and having an output at which d.c. power is generated, and a switch-over means 82 connected to the battery backup means 62 output and to the rectifier means 32 input, the battery backup means 62 being responsive to a failure of a.c. power at the battery backup means 62 input for controlling the switch-over means 82 to connect the battery backup means 62 output to the rectifier means 32 input to provide d.c. power to illuminate the LED array 12 and being responsive to a.c. power at the battery backup means 62 input for controlling the switch-over means 82 to disconnect the battery backup means 62 output from the rectifier means 32 input. The switch-over means 82 can be an electromechanical relay. The battery backup means 62 includes a time delay and restoration means 78 responsive to application of a.c. power at the battery backup means 62 input for controlling the switch-over means 82 to disconnect the battery backup means 62 output from the rectifier means 32 input and connect the a.c. power to the rectifier means 32 input after a predetermined time delay. The battery backup means 62 also includes a d.c. power switch-over and flasher means 80 connected to the switch-over means 82 for pulsing the d.c. power at a predetermined rate to flash the LED array 12 and a synchronizing pulse generator means 86 connected to the d.c. power switch-over and flasher means 80 for imposing marker pulses on the d.c. power at a predetermined rate.

The apparatus 10 also includes a half wave power detector means 88 having an input connected to the input of the rectifier means 32 and an output connected to another input of the power factor correction converter means 38, the half wave power detector means being responsive to a dimming signal at the rectifier means input for generating a control signal at said half wave power detector means output and the power factor correction converter means 38 being responsive to the control signal for decreasing the regulated d.c. power to dim the LED array 12. If the apparatus 10 includes the pulse width modulated modulator means 46 connected to the power factor correction converter means 38 output and the LED array 12 input for modulating the regulated voltage d.c. power, the half wave power detector means 88 has its output connected to an input of the pulse width modulated modulator means 46 and is responsive to a dimming signal at the rectifier means input for generating a control signal at the half wave power detector means output and the pulse width modulated modulator means 46 is responsive to the control signal for decreasing the regulated d.c. power to dim the LED array 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

[1. An apparatus for supplying regulated voltage d.c. electrical power to an LED array comprising:

a rectifier means (32) having an input and an output, said rectifier means (32) being responsive to a.c. power at said input for generating rectified d.c. power at said output;

a power factor correction converter means (38) having an input connected to said output of said rectifier means (32) and an output, said power factor correction converter means (38) being responsive to said rectified d.c. power at said power factor correction converter means input for generating regulated voltage d.c. power at said power factor correction convener means output; and an LED array (12) having an input connected to said output of said power factor correction converter means (38) for receiving said regulated voltage d.c. power to illuminate said LED array (12).]

[2. The apparatus according to claim 1 wherein said power factor correction converter means (38) is a power factor correcting and voltage regulating buck/boost switchmode converter.]

[3. The apparatus according to claim 1 including a pulse width modulated modulator means (46) connected to said output of said power factor correction converter means (38) and to said input of said LED array (12) for modulating said regulated voltage d.c. power.]

[4. The apparatus according to claim 1 including an electromagnetic interference filter means (28) connected to said input of said rectifier means (32) for preventing conducted interference from feeding back onto a.c. power lines (22) connected to said rectifier means input.]

[5. The apparatus according to claim 1 including an adaptive clamp circuit means (24) connected to said input of said rectifier means (32) for eliminating leakage current problems.]

[6. The apparatus according to claim 5 wherein said adaptive clamp circuit means (24) has an input adapted to be connected to a pair of a.c. power lines (22), a pair of clamp circuit output lines (26) connected to said adaptive clamp circuit means input, a voltage sensing means (48) connected across said input of said adaptive clamp circuit means (24), and a controlled load means (50) connected across said clamp circuit output lines (26) and to said voltage sensing means (48), said voltage sensing means (48) being responsive to a magnitude of a.c. voltage at said adaptive clamp circuit means input lower than a predetermined magnitude for turning on said controlled load means (50) to connect a low impedance load (60) in said controlled load means (50) across said clamp circuit output lines (26) and said voltage sensing means (48) being responsive to a magnitude of the a.c. voltage at said adaptive clamp circuit means input equal to or greater than said predetermined magnitude for turning off said controlled load means (50) to disconnect said low impedance load (60) from said clamp circuit output lines (26).]

[7. The apparatus according to claim 1 including a battery backup means (62) having an input for receiving a.c. power applied to said input of said rectifier means (32) and having an output at which d.c. power is generated, and a switchover means (82) connected to said output of said battery backup means (62) and to said rectifier means input, said battery backup means (62) being responsive to a failure of a.c. power at said battery backup means input for controlling said switch-over means (82) to connect said output of said battery backup means (62) to said input of said rectifier means (32) to provide d.c. power to illuminate said LED array (12) and being responsive to a.c. power at said battery backup means input for controlling said switch-over means (82) to disconnect said battery backup means output from said rectifier means input.]

[8. The apparatus according to claim 7 wherein said switch-over means (82) is an electromechanical relay.]

[9. The apparatus according to claim 7 wherein said battery backup means (62) includes a time delay and restoration means (78) responsive to application of a.c. power at said input of said battery backup means (62) for controlling said switch-over means (82) to disconnect said output of said battery backup means (62) from said input of said full wave rectifier means (32) and connect the a.c. power to said full wave rectifier means input after a predetermined time delay.]

[10. The apparatus according to claim 7 wherein said battery backup means (62) includes a d.c. power switch-over and flasher means (80) connected to said switch-over means (82) for pulsing said d.c. power at a predetermined rate to flash said LED array (12).]

[11. The apparatus according to claim 7 wherein said battery backup means (62) includes a synchronizing pulse generator means (86) connected to said d.c. power switchover and flasher means (80) for imposing marker pulses on said d.c. power at a predetermined rate.]

[12. The apparatus according to claim 1 including a half wave power detector means (88) having an input connected to said input of said rectifier means (32) and an output connected to another input of said power factor correction converter means (38), said half wave power detector means (88) being responsive to a dimming signal at said rectifier means input for generating a control signal at said half wave power detector means output and said power factor correction converter means (38) being responsive to said control signal for decreasing said regulated d.c. power to dim said LED array (12).]

[13. The apparatus according to claim 1 including a pulse width modulated modulator means (46) connected to said output of said power factor correction converter means (38) and to said input of said LED array (12) for modulating said regulated voltage d.c. power and a half wave power detector means (88) having an input connected to said input of said rectifier means (32) and an output connected to an input of said pulse width modulated modulator means (46), said half wave power detector means being responsive to a dimming signal at said rectifier means input for generating a control signal at said half wave power detector means output and said pulse width modulated modulator means (46) being responsive to said control signal for decreasing said regulated d.c. power to dim said LED array (12).]

[14. An apparatus for supplying regulated voltage d.c. electrical power to an LED array comprising:

a power supply means (10) having an input and an output, said power supply means (10) being responsive to a.c. power at said input for generating regulated voltage d.c. power at said output to illuminate an LED array (12) connected to said power supply means output; and a dimming detector means (88) having an input connected to said input of said power supply means (10) and an output connected to another input of said power supply means (10), said dimming detector means (88) being responsive to a dimming signal at said power supply means input for generating a control signal at said dimming detector means output and said power supply means (10) being responsive to said control signal for decreasing said regulated voltage d.c. power to dim the LED array (12).]

[15. The apparatus according to claim 14 wherein said dimming detector means (88) is a half wave power detector means, said dimming signal is half wave rectified a.c. power and said power supply means (10) includes a rectifier means (32) having an input connected to said power supply means input and an output and a power factor correction converter means (38) having an input connected to said rectifier means output and an output connected to said power supply output, said power factor correction converter means (38) including said another input of said power supply means (10), said power factor correction convener means (38) being responsive to said control signal for decreasing said regulated voltage d.c. power to dim the LED array (12).]

[16. The apparatus according to claim 14 wherein said dimming detector means (88) is a half wave power detector means, said dimming signal is half wave rectified a.c. power and including a pulse width modulated modulator means (46) connected to said output of said power supply means (10) for modulating said regulated voltage d.c. power, said pulse width modulated modulator means (46) including said another input of said power supply means (10), said pulse width modulated modulator means (46) being responsive to said control signal for decreasing said regulated voltage d.c. power to dim the LED array (12).]

[17. An apparatus for supplying regulated voltage d.c. electrical power to an LED array comprising:

a rectifier means (32) having an input and an output, said rectifier means (32) being responsive to a.c. power at said input for generating rectified d.c. power at said output;

a power factor correction converter means (38) having an input connected to said output of said rectifier means (32) and an output, said power factor correction converter means (38) being responsive to said rectified d.c. power at said power factor correction converter means input for generating regulated voltage d.c. power at said power factor correction converter means output;

a battery backup means (62) having an input for receiving a.c. power applied to said input of said rectifier means (32) and having an output at which d.c. power is generated; and a switch-over means (82) connected to said output of said battery backup means (62) and to said input of said rectifier means (32), said battery backup means (62) being responsive to a failure of a.c. power at said battery backup means input for controlling said switchover means (82) to connect said battery backup means output to said rectifier means input to provide d.c. power to said power factor correction converter means (38) to illuminate an LED array connected to said output of said power factor correction converter means (38) and being responsive to a.c. power at said battery backup means input for controlling said switch-over means (82) to disconnect said battery backup means output from said rectifier means input.]

[18. The apparatus according to claim 17 wherein said power correction converter means (38) is a power factor correcting and voltage regulating buck/boost switchmode converter.]

[19. The apparatus according to claim 17 including an adaptive clamp circuit means (24) connected to said input of said rectifier means (32) for eliminating leakage current problems, said adaptive clamp circuit means (24) having an input adapted to be connected to a pair of a.c. power lines (22), a pair of clamp circuit output lines (26) connected to said adaptive clamp circuit means input, a voltage sensing means (48) connected across said adaptive clamp circuit means input, and a controlled load means (50) connected across said clamp circuit output lines (26) and to said voltage sensing means (48), said voltage sensing means (48) being responsive to a magnitude of a.c. voltage at said adaptive clamp circuit means input lower than a predetermined magnitude for turning on said controlled load means (50) to connect a low impedance load (60) in said controlled load means (50) across said clamp circuit output lines (26) and said voltage sensing means (48) being responsive to a magnitude of the a.c. voltage at said adaptive clamp circuit means input equal to or greater than said predetermined magnitude for turning off said controlled load means (50) to disconnect said low impedance load (60) from said clamp circuit output lines (26).]

[20. The apparatus according to claim 17 wherein said battery backup means (62) includes a time delay and restoration means (78) responsive to application of a.c. power at said input of said battery backup means (62) for controlling said switch-over means (82) to disconnect said output of said battery backup means (62) from said input of said rectifier means (32) and connect the a.c. power to said rectifier means input after a predetermined time delay.]

[21. The apparatus according to claim 17 wherein said battery backup means (62) includes a d.c. power switch-over and flasher means (80) connected to said switch-over means (82) for pulsing said d.c. power at a predetermined rate to flash said LED array (12).]

[22. The apparatus according to claim 17 Wherein said battery backup means (62) includes a synchronizing pulse generator means (86) connected to said d.c. power switchover and flasher means (80) for imposing marker pulses on said d.c. power at a predetermined rate.]

[23. An apparatus for supplying regulated voltage d.c. electrical power to an LED array comprising:

a rectifier means (32) having an input and an output, said rectifier means (32) being responsive to a.c. power at said input for generating rectified d.c. power at said output;

a power factor correcting and voltage regulating buck/boost switchmode converter (38) having an input connected to said output of said rectifier means (32) and an output, said switchmode converter (38) being responsive to said rectified d.c. power at said switchmode converter input for generating regulated voltage d.c. power at said switchmode converter output;

an LED array (12) having an input connected to said output of said switchmode converter (38) for receiving said regulated voltage d.c. power to illuminate said LED array (12);

a battery backup means (62) having an input for receiving a.c. power applied to said input of said rectifier means (32) and having an output at which d.c. power is generated; and a switch-over means (82) connected to said output of said battery backup means (62) and to said input of said rectifier means (32), said battery backup means (62) being responsive to a failure of a.c. power at said battery backup means input for controlling said switchover means (82) to connect said battery backup means output to said rectifier means input to provide d.c. power to said switchmode converter (38) to illuminate said LED array (12) and being responsive to a.c. power at said battery backup means input for controlling said switchover means (82) to disconnect said battery backup means output from said rectifier means input.]

*24. A power supply assembly for powering light emitting diodes (LEDs) in an outdoor line-connected signal, comprising:*

*an electrical input for coupling to a source of a.c. line voltage through a solid state traffic controller switch for providing an electrical input voltage having an operating range with a lower limit voltage sufficient to activate the LEDs when the switch is on;*

*a rectifier coupled to the electrical input and having a rectifier output;*

*a line voltage regulating switchmode power supply having a power supply input coupled to the rectifier output and a power supply output;*

*a plurality of LEDs coupled to the power supply output and having multiple current paths for emitting light in response to the power supply output; and*

*a conflict monitor compatibility circuit including a low impedance load and a transistor in series connection with the low impedance load, the transistor being biased as a switch having an essentially nonconductive condition whenever the electrical input voltage is at or above the operating range lower limit voltage and an essentially conductive condition if the electrical input voltage drops to a predetermined value below the operating range lower limit voltage, wherein:*

*the transistor in the essentially nonconductive condition prevents dissipation of power from the power supply output through the low impedance load whenever the electrical input voltage is within the operating range, and*

*the transistor in the essentially conductive condition couples the low impedance load to the electrical input for shunting leakage current from the solid state traffic controller switch when the switch is off.*

*25. A power supply assembly for powering light emitting diodes (LEDs) in an outdoor line-connected signal, comprising:*

*an electrical input for coupling to a source of a.c. line voltage through a solid state traffic controller switch for providing an electrical input voltage having an operating range with a lower limit voltage sufficient to activate the LEDs when the switch is on;*

*a rectifier coupled to the electrical input and having a rectifier output;*

*a switchmode power supply for maintaining current and voltage waveforms substantially in phase and for providing a regulated current output with respect to variations in the input line voltage, the power supply having a power supply input coupled to the rectifier output and a power supply output;*

*a plurality of LEDs coupled to the power supply output and having multiple current paths for emitting light in response to the power supply output; and*

*a conflict monitor compatibility circuit including a low impedance load and a transistor in series connection with the low impedance load, the transistor being biased as a switch having an essentially nonconductive condition whenever the electrical input voltage is at or above the operating range lower limit voltage and an essentially conductive condition if the electrical input voltage drops to a predetermined value below the operating range lower limit voltage, wherein:*

*the transistor in the essentially nonconductive condition prevents dissipation of power from the power supply output through the low impedance load whenever the electrical input voltage is within the operating range, and*

*the transistor in the essentially conductive condition couples the low impedance load to the electrical input for shunting leakage current from the solid state traffic controller switch when the switch is off.*

*26. A power supply assembly for powering light emitting diodes (LEDs) in an outdoor line-connected signal, comprising:*

*an electrical input for coupling to a source of a.c. line voltage through a solid state traffic controller switch for providing an electrical input voltage having an operating range with a lower limit voltage sufficient to activate the LEDs when the switch is on;*

*a rectifier coupled to the electrical input and having a rectifier output;*

*a switchmode power supply for improving poor power factor, whereby the power supply provides essentially constant current at a power supply output with respect to variations in line voltage input, and whereby current and voltage waveforms are maintained substantially in phase, the power supply having a power supply input coupled to the rectifier output and a power supply output;*

*a plurality of LEDs coupled to the power supply output and having multiple current paths for emitting light in response to the power supply output; and*

*a conflict monitor compatibility circuit including a low impedance load and a transistor in series connection with the low impedance load, the transistor being biased as a switch having an essentially nonconductive condition whenever the electrical input voltage is at or above the operating range lower limit voltage and an essentially conductive condition if the electrical input voltage drops to a predetermined value below the operating range lower limit voltage, wherein:*

*the transistor in the essentially nonconductive condition prevents dissipation of power from the power supply output through the low impedance load whenever the electrical input voltage is within the operating range, and*

*the transistor in the essentially conductive condition couples the low impedance load to the electrical input for shunting leakage current from the solid state traffic controller switch when the switch is off.*

*27. The assembly according to claim 24, 25 or 26 wherein the switchmode power supply comprises an integrated circuit power supply.*

*28. The assembly of claim 27 wherein the integrated circuit power supply comprises a power factor correcting switchmode converter integrated circuit.*

*29. The assembly according to claim 24, 25 or 26 wherein the plurality of LEDs comprise a plurality of series-parallel connected LEDs arranged in strings.*

*30. The assembly according to claim 29 wherein the plurality of LEDs comprise a ballast resistor in each string.*

*31. A conflict monitor compatibility circuit for use in traffic and pedestrian signaling applications, comprising:*

*a plurality of LEDs for emitting light in response to an electrical input adapted to be coupled to a source of a.c. line voltage through a solid state traffic controller switch for providing an electrical input voltage having an operating range with a lower limit voltage sufficient to activate the LEDs when the switch is on;*

*a transistor biased as a switch that has an essentially nonconductive condition whenever the electrical input voltage is at or above the operating range lower limit voltage and an essentially conductive condition if the electrical input voltage drops to a predetermined value below the operating range lower limit voltage; and*

*a low impedance load in series connection with the transistor, wherein:*

*the transistor in the essentially nonconductive condition prevents dissipation of power through the low impedance load whenever the electrical input voltage is within the operating range, and*

*the transistor in the essentially conductive condition couples the low impedance load to the electrical input for shunting leakage current from the solid state traffic controller switch when the switch is off.*

*32. The assembly according to claim 24, 25, or 26, wherein the conflict monitor compatibility circuit further includes a sensor for providing a control output if the electrical input voltage drops below the predetermined value and a control element for switching the transistor to the essentially conductive condition in response to the control output.*

*33. The assembly according to claim 32, wherein the sensor is a Zener diode that conducts in a reverse direction only at voltages above the predetermined value.*

*34. The assembly according to claim 33, wherein the control element is a second transistor biased as a switch and having a base coupled to the Zener diode.*

*35. The assembly according to claim 24, 25, or 26, further comprising an electromagnetic interference filter coupled to the power supply for preventing conducted interference from feeding back onto the a.c. line.*

*36. The assembly according to claim 24, 25, or 26, further comprising a traffic, pedestrian or rail crossing signal housing enclosing the assembly.*

*37. The conflict monitor compatibility circuit according claim 31, further comprising a sensor for providing a control output if the electrical input voltage drops below the predetermined value and a control element for switching the transistor to the essentially conductive condition in response to the control output.*

*38. The conflict monitor compatibility circuit according to claim 37, wherein the sensor is a Zener diode that conducts in a reverse direction only at voltages above the predetermined value.*

*39. The conflict monitor compatibility circuit according to claim 38, wherein the control element is a second transistor biased as a switch and having a base coupled to the Zener diode.*

* * * * *